(12) United States Patent
Yamahara

(10) Patent No.: US 9,418,380 B2
(45) Date of Patent: Aug. 16, 2016

(54) INFORMATION PROVIDING DEVICE, INFORMATION PROVIDING METHOD, PROGRAM, INFORMATION STORAGE MEDIUM, AND INFORMATION PROVIDING SYSTEM

(71) Applicant: Rakuten, Inc., Shinagawa-ku, Tokyo (JP)

(72) Inventor: Hisanori Yamahara, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 14/362,595

(22) PCT Filed: Feb. 28, 2013

(86) PCT No.: PCT/JP2013/055426
§ 371 (c)(1),
(2) Date: Jun. 3, 2014

(87) PCT Pub. No.: WO2013/146075
PCT Pub. Date: Oct. 3, 2013

(65) Prior Publication Data
US 2014/0344293 A1    Nov. 20, 2014

(30) Foreign Application Priority Data

Mar. 30, 2012   (JP) .................................. 2012-082330

(51) Int. Cl.
*G06Q 30/06*  (2012.01)
*G06F 7/22*   (2006.01)
*G06F 17/30*  (2006.01)

(52) U.S. Cl.
CPC .............. *G06Q 30/0625* (2013.01); *G06F 7/22* (2013.01); *G06F 17/3053* (2013.01); *G06Q 30/06* (2013.01); *G06Q 30/0641* (2013.01)

(58) Field of Classification Search
CPC .............. G06Q 30/0625; G06Q 30/06; G06Q 30/0641; G06F 17/3053; G06F 7/22
See application file for complete search history.

(56) References Cited

U.S. PATENT DOCUMENTS 7,133,859 B1 * 11/2006 Wong ..................... G06Q 10/10
2003/0115189 A1 * 6/2003 Srinivasa et al. .................. 707/3
(Continued)

FOREIGN PATENT DOCUMENTS

| JP | H11-212987 A  | 8/1999 |
| JP | 2009-163405 A | 7/2009 |
| JP | 2011-138269 A | 7/2011 |

OTHER PUBLICATIONS

Partial translation of Office Action for corresponding Japanese Patent Application No. 2012-082330 dated on Jul. 23, 2013.

*Primary Examiner* — Daniel Kinsaul
(74) *Attorney, Agent, or Firm* — Hubbs, Enatsky & Inoue PLLC

(57) ABSTRACT

A plurality of items of data, each having a plurality of items of attribute information, are sorted in order of most comprehensively satisfying conditions relating to the plurality of items of attribute information. An information providing server includes a single sorting unit that calculates, for each of the plurality of items of data having the plurality of items of attribute information and included in a data group, an evaluation value for sorting the data group based on a sort key designated for one of the plurality of items of attribute information. The information providing server includes a multiple sorting unit that sorts the data group based on a plurality of multiple evaluation values that are calculated, for respective items of data included in the data group, based on the evaluation values and the respective weights of the plurality of sort keys, each of the evaluation values being calculated.

10 Claims, 21 Drawing Sheets

(56) References Cited

U.S. PATENT DOCUMENTS

| | | | |
|---|---|---|---|
| 2003/0126130 A1* | 7/2003 | Martino et al. | 707/7 |
| 2007/0016599 A1* | 1/2007 | Plastina et al. | 707/101 |
| 2007/0106658 A1* | 5/2007 | Ferrari et al. | 707/5 |
| 2008/0114754 A1* | 5/2008 | Karasudani et al. | 707/5 |
| 2008/0154878 A1* | 6/2008 | Rose et al. | 707/5 |
| 2009/0055759 A1* | 2/2009 | Svendsen | 715/764 |
| 2009/0138505 A1* | 5/2009 | Purdy | 707/104.1 |
| 2009/0164948 A1* | 6/2009 | Kramer | 715/856 |
| 2009/0193099 A1* | 7/2009 | Partridge et al. | 709/219 |
| 2010/0088314 A1* | 4/2010 | Kuang | 707/733 |
| 2010/0122211 A1* | 5/2010 | Abernethy et al. | 715/810 |
| 2010/0125568 A1* | 5/2010 | van Zwol | G06K 9/46 707/722 |
| 2011/0010371 A1* | 1/2011 | Xu et al. | 707/749 |
| 2012/0239781 A1 | 9/2012 | Yamahara | |
| 2012/0246178 A1* | 9/2012 | Holsman | 707/751 |
| 2012/0324367 A1* | 12/2012 | Ilyas et al. | 715/747 |
| 2013/0103672 A1* | 4/2013 | Parikh et al. | 707/717 |

* cited by examiner

FIG.3

PRODUCT INFORMATION TABLE

| PRODUCT ID | PRODUCT NAME | KEYWORD | SHOP ID | PRICE | AVAILABLE SHIPPING DATE | REGISTRATION DATE | NUMBER OF REVIEWS |
|---|---|---|---|---|---|---|---|
| M0001 | C001A | CAMERA C001A SINGLE-LENS REFLEX | S0001 | 50,000 | 2012.2.18 | 2012.2.10 | 50 |
| M0002 | C001A | CAMERA C001A SINGLE-LENS REFLEX | S0002 | 50,500 | 2012.2.14 | 2012.2.13 | 10 |
| M0003 | C001A | CAMERA C001A INTERCHANGEABLE LENSES | S0003 | 51,000 | 2012.2.15 | 2012.2.10 | 100 |
| M0004 | C001A | DIGITAL CAMERA C001A | S0004 | 51,500 | 2012.2.16 | 2012.1.30 | 60 |
| M0005 | C001A | CAMERA C001A | S0005 | 51,500 | 2012.2.14 | 2012.2.1 | 30 |

FIG.4

USER REQUEST HISTORY TABLE

| USER ID | SEARCH CONDITION | SORT CONDITION (SORT KEY: WEIGHT) | PROCESSING DATE AND TIME |
|---------|------------------|-----------------------------------|--------------------------|
| U0001 | CAMERA C001A | — | 2012.2.13 7:00 |
| U0001 | CAMERA C001A | LOWEST PRICE:1 | 2012.2.13 7:01 |
| U0001 | CAMERA C001A | EARLIEST SHIPPING DATE: 1 | 2012.2.13 7:02 |
| U0001 | CAMERA C001A | LOWEST PRICE: 0.6 EARLIEST SHIPPING DATE: 0.4 | 2012.2.13 7:03 |
| ⋮ | ⋮ | ⋮ | ⋮ |
| U0001 | SHOES S001B | EARLIEST SHIPPING DATE: 1 | 2012.2.15 10:00 |
| ⋮ | ⋮ | ⋮ | ⋮ |
| U0001 | BAG B | EARLIEST SHIPPING DATE: 0.6 LOWEST PRICE: 0.4 | 2012.2.15 10:00 |
| ⋮ | ⋮ | ⋮ | ⋮ |
| U0002 | CAMERA C001A | — | 2012.2.17 10:00 |

FIG.7

| SORT KEY | RANK | PRODUCT ID | PRICE | EVALUATION VALUE |
|---|---|---|---|---|
| PRICE (LOWEST) | 1 | M0001 | 50,000 | 1 |
| | 2 | M0002 | 50,500 | 2 |
| | 3 | M0003 | 51,000 | 3 |
| | 4 | M0004 | 51,500 | 4 |
| | 4 | M0005 | 51,500 | 4 |

FIG.8

| SORT KEY | RANK | PRODUCT ID | AVAILABLE SHIPPING DATE | EVALUATION VALUE |
|---|---|---|---|---|
| SHIPPING DATE (EARLIEST) | 1 | M0002 | 2012.214 | 1 |
| | 1 | M0005 | 2012.214 | 1 |
| | 3 | M0003 | 2012.215 | 3 |
| | 4 | M0004 | 2012.216 | 4 |
| | 5 | M0001 | 2012.218 | 5 |

FIG.9

| SORT CONDITION | PRODUCT ID | SORT KEY 1 EVALUATION VALUE | SORT KEY 2 EVALUATION VALUE | MULTIPLE EVALUATION VALUE | OVERALL RANK |
|---|---|---|---|---|---|
| SORT KEY 1: PRICE (LOWEST) SORT KEY 1 WEIGHT: 0.6 SORT KEY 2: SHIPPING DATE (EARLIEST) SORT KEY 2 WEIGHT: 0.4 | M0001 | 1 | 5 | 2.4 | 2 |
| | M0002 | 2 | 1 | 1.6 | 1 |
| | M0003 | 3 | 3 | 3 | 4 |
| | M0004 | 4 | 4 | 4 | 5 |
| | M0005 | 4 | 1 | 2.8 | 3 |

FIG.15

| | | | USER U0001 |
|---|---|---|---|
| CAMERA C001A | SEARCH | | LOGOUT |
| SORT KEY 1 | | | |
| LOWEST PRICE ▽ | | | ADD KEY |
| | | | SORT |

| | | | |
|---|---|---|---|
| A ○ | CAMERA C001A SHOP : S0001 | 50 REVIEWS | 50,000 YEN |
| B ○ | CAMERA C001A SHOP : S0002 | 10 REVIEWS | 50,500 YEN |
| C ○ | CAMERA C001A SHOP : S0003 | 100 REVIEWS | 51,000 YEN |
| D ○ | CAMERA C001A SHOP : S0004 | 60 REVIEWS | 51,500 YEN |
| E ○ | CAMERA C001A SHOP : S0005 | 30 REVIEWS | 51,500 YEN |

FIG.18

| | | | USER U0001 |
|---|---|---|---|
| CAMERA C001A | | SEARCH | LOGOUT |

SORT KEY 1 · SORT KEY 2

| LOWEST PRICE ▽ | EARLIEST SHIPPING DATE ▽ | ADD KEY |
|---|---|---|
| WEIGHT 60 % | 40 % | SORT |

| B ○ | CAMERA C001A SHOP : S0002 | 10 REVIEWS | 50,500 YEN |
| E ○ | CAMERA C001A SHOP : S0005 | 30 REVIEWS | 51,500 YEN |
| C ○ | CAMERA C001A SHOP : S0003 | 100 REVIEWS | 51,000 YEN |
| D ○ | CAMERA C001A SHOP : S0004 | 60 REVIEWS | 51,500 YEN |
| A ○ | CAMERA C001A SHOP : S0001 | 50 REVIEWS | 50,000 YEN |

INFORMATION PROVIDING DEVICE, INFORMATION PROVIDING METHOD, PROGRAM, INFORMATION STORAGE MEDIUM, AND INFORMATION PROVIDING SYSTEM

CROSS REFERENCE TO RELATED APPLICATIONS

This application is a National Stage of International Application No. PCT/JP2013/055426 filed Feb. 28, 2013 claiming priority based on Japanese Patent Application No. 2012-082330 filed on Mar. 30, 2012. The contents of each of the above documents are incorporated herein by reference in their entirety.

TECHNICAL FIELD

The present invention relates to an information providing device, an information providing method, a program, an information storage medium and an information providing system.

BACKGROUND ART

There has been available an e-commerce system to access an online shopping site that constructs a virtual mall with a plurality of virtual shops on the Internet in order to purchase a product (or a service) at a shop that corresponds to each of the virtual shops. In such an e-commerce system, there is a case where, after searching product information based on a keyword specified by a user, the system sorts the products listed in the search result by using attribute information of the products as a sort key. For example, after a product group (sort target data group) is specified by search or product categories, the products are rearranged in an order of one of the conditions, such as "lowest price", "highest price", "newly-arrived", "number of reviews", and "date of shipment" (see Patent Literature 1 below).

CITATION LIST

Patent Literature

Patent Literature 1: JP2011-138269A

SUMMARY OF INVENTION

Technical Problem

However, in a case of seasonal products that are priced lower as the date of shipment is delayed, there is a need for a user to find a product that is not only "lower in price" but also satisfies multiple aspects, such as "earlier shipment date" and "lower in price" at a relatively high level. With the conventional technology in which sort target data group is sorted based on one sort key, it is extremely difficult to find a product to satisfy each of the multiple aspects at a relatively high level.

One or more embodiments of the present invention have been conceived in view of the above, and an object thereof is to provide an information providing device, an information providing method, a program, an information storage medium, and an information providing system for providing a sort result in which a plurality of items of data each having a plurality of items of attribute information are sorted in order of most comprehensively satisfying conditions relating to the plurality of items of attribute information.

Solution to Problem

In order to solve the above described problems, an information providing device according to an embodiment of the present invention includes specifying means for specifying, as a sort target, a data group that includes a plurality of items of data, each item of data including a plurality of items of attribute information, calculating means for calculating, for each item of data included in the data group, an evaluation value for sorting the data group based on a sort key that is designated for one of the plurality of items of attribute information, obtaining means for obtaining a plurality of sort keys for sorting the data group and a weight of each of the plurality of sort keys, sorting means for sorting the data group based on a plurality of multiple evaluation values that are calculated, for respective items of data included in the data group, based on the evaluation values and the respective weights of the plurality of sort keys, each of the evaluation values being calculated by the calculating means for each of the plurality of sort keys, and providing means for providing at least part of a sort result by the sorting means.

In one embodiment of the present invention, the information providing device may further include weight setting means for calculating, in the data group, variability of the items of attribute information, each of which is designated for each of the plurality of sort keys, and setting the weights of the respective sort keys such that the sort key having a greater variability has a greater weight.

In one embodiment of the present invention, the information providing device may further include managing means for managing, for each user, history information of the sort keys used for sorting the data group, and setting means for setting at least either of the plurality of sort keys and the weights of the respective sort keys based on history information managed by the managing means for a user who requests to sort the data group specified by the specifying means.

In one embodiment of the present invention, in a case where a plurality of sorts are executed a predetermined times for the data group, the sorts respectively designating sort keys different from one another, the setting means may set the plurality of sort keys based on the designated sort keys.

In one embodiment of the present invention, the setting means may set a weight of each of the plurality of sort keys based on at least either of an order in which the sorts are executed and a number of times the sorts are executed, the sorts respectively designating sort keys different from one another in the data group.

In one embodiment of the present invention, the information providing device may further include presenting means for presenting, in a case where the sorts respectively designating sort keys different from one another are executed the predetermined times in the data group, the user with information on a page on which the sort result by the sorting means is displayed, the sort result being based on the plurality of sort keys set by the setting means and the respective weights of the plurality of sort keys.

In one embodiment of the present invention, the information providing device may further include updating means for updating, in a case where a total sum of the weights of the plurality of sort keys is a constant value and one of the weights of the plurality of sort keys is updated, the weights of other sort keys such that the total sum of the weights of the plurality of sort keys is the constant value.

In one embodiment of the present invention, in a case where the plurality of sort keys are three or more and one of the weights of the plurality of sort keys is updated, the updating means may update the weights of other sort keys such that the total sum of the weights of the plurality of sort keys is the constant value and a ratio among the weights of other sort keys remains unchanged.

An information providing method according to an embodiment of the present invention includes a specifying step for specifying, as a sort target, a data group that includes a plurality of items of data, each item of data including a plurality of items of attribute information, a calculating step for calculating, for each item of data included in the data group, an evaluation value for sorting the data group based on a sort key that is designated for one of the plurality of items of attribute information, an obtaining step for obtaining a plurality of sort keys for sorting the data group and a weight of each of the plurality of sort keys, a sorting step for sorting the data group based on a plurality of multiple evaluation values that are calculated, for respective items of data included in the data group, based on the evaluation values and the respective weights of the plurality of sort keys, each of the evaluation values being calculated in the calculating step for each of the plurality of sort keys, and a providing step for providing at least part of a sort result by the sorting means.

A program according to an embodiment of the present invention causes a computer to function as specifying means for specifying, as a sort target, a data group that includes a plurality of items of data, each item of data including a plurality of items of attribute information, calculating means for calculating, for each item of data included in the data group, an evaluation value for sorting the data group based on a sort key that is designated for one of the plurality of items of attribute information, obtaining means for obtaining a plurality of sort keys for sorting the data group and a weight of each of the plurality of sort keys, sorting means for sorting the data group based on a plurality of multiple evaluation values that are calculated, for respective items of data included in the data group, based on the evaluation values and the respective weights of the plurality of sort keys, each of the evaluation values being calculated by the calculating means for each of the plurality of sort keys, and providing means for providing at least part of a sort result by the sorting means.

An information storage medium according to an embodiment of the present invention stores a program for causing a computer to function as specifying means for specifying, as a sort target, a data group that includes a plurality of items of data, each item of data including a plurality of items of attribute information, calculating means for calculating, for each item of data included in the data group, an evaluation value for sorting the data group based on a sort key that is designated for one of the plurality of items of attribute information, obtaining means for obtaining a plurality of sort keys for sorting the data group and a weight of each of the plurality of sort keys, sorting means for sorting the data group based on a plurality of multiple evaluation values that are calculated, for respective items of data included in the data group, based on the evaluation values and the respective weights of the plurality of sort keys, each of the evaluation values being calculated by the calculating means for each of the plurality of sort keys, and providing means for providing at least part of a sort result by the sorting means.

An information providing system according to an embodiment of the present invention includes specifying means for specifying, as a sort target, a data group that includes a plurality of items of data, each item of data including a plurality of items of attribute information, calculating means for calculating, for each item of data included in the data group, an evaluation value for sorting the data group based on a sort key that is designated for one of the plurality of items of attribute information, obtaining means for obtaining a plurality of sort keys for sorting the data group and a weight of each of the plurality of sort keys, sorting means for sorting the data group based on a plurality of multiple evaluation values that are calculated, for respective items of data included in the data group, based on the evaluation values and the respective weights of the plurality of sort keys, each of the evaluation values being calculated by the calculating means for each of the plurality of sort keys, and display means for displaying at least part of a sort result by the sorting means.

Advantageous Effects of Invention

According to an embodiment of the present invention, the sort target data group is sorted by a condition in which a plurality of sort keys are associated with their weights, thereby providing a sort result in which a plurality of items of data each having a plurality of items of attribute information are sorted in order of most comprehensively satisfying conditions relating to the plurality of items of attribute information.

BRIEF DESCRIPTION OF DRAWINGS

FIG. 3 A diagram illustrating an example of a product information table.

FIG. 4 A diagram illustrating an example of a user request history table.

FIG. 7 A diagram illustrating an example of a result of single sort processing.

FIG. 8 A diagram illustrating an example of a result of single sort processing.

FIG. 9 A diagram illustrating an example of a result of multiple sort processing.

FIG. 15 A diagram illustrating an example of the product list display screen.

FIG. 18 A diagram illustrating an example of the product list display screen.

FIG. 19 A diagram illustrating an example of the product list display screen.

FIG. 20 A diagram illustrating an example of the product list display screen.

DESCRIPTION OF EMBODIMENTS

In the following, an embodiment of the present invention will be described in detail with reference to the accompanying drawings.

1. System Configuration

Figure 1:
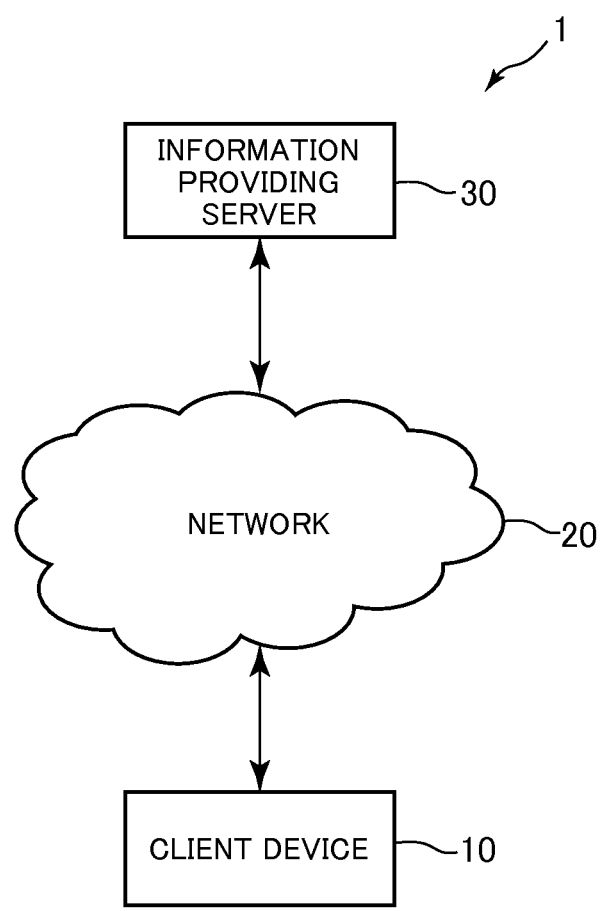
FIG. 1 A diagram illustrating a system configuration of an information providing system according to an embodiment of the present invention.

FIG. 1 is a diagram showing a system configuration of an information providing system 1 according to an embodiment of the present invention. As shown in FIG. 1, an information providing system 1 includes a client device 10 and an information providing server 30. The client device 10 is in data communication with the information providing server 30 through a network 20, such as the Internet. The information providing server 30 may be included in an e-commerce system, and provides information on products to the client device 10 in the e-commerce system.

The client device 10 is a computer operated by a user, such as a personal computer, mobile phone, PDA, and tablet terminal. The client device 10 executes, for example, an application such as a web browser, communicates with the information providing server 30 using the web browser, and receives information on a product or a service from the providing server 30. The client device 10 causes display means, such as a build-in or externally-connected liquid crystal display, to display a screen based on the received information.

The information providing server 30 is a computer that retains information on products sold in each shop, and provides the client device 10 with information on a product corresponding to a request received from the client device 10. This embodiment explains an example in which the information providing server 30 provides information on products. However, the present invention is not to be limited to the case where information on products is provided but also applicable to the case where information on services is provided. In the following, the details of the information providing server 30 will be explained.

2. Functional Block Diagram of Information Providing Server

Figure 2:
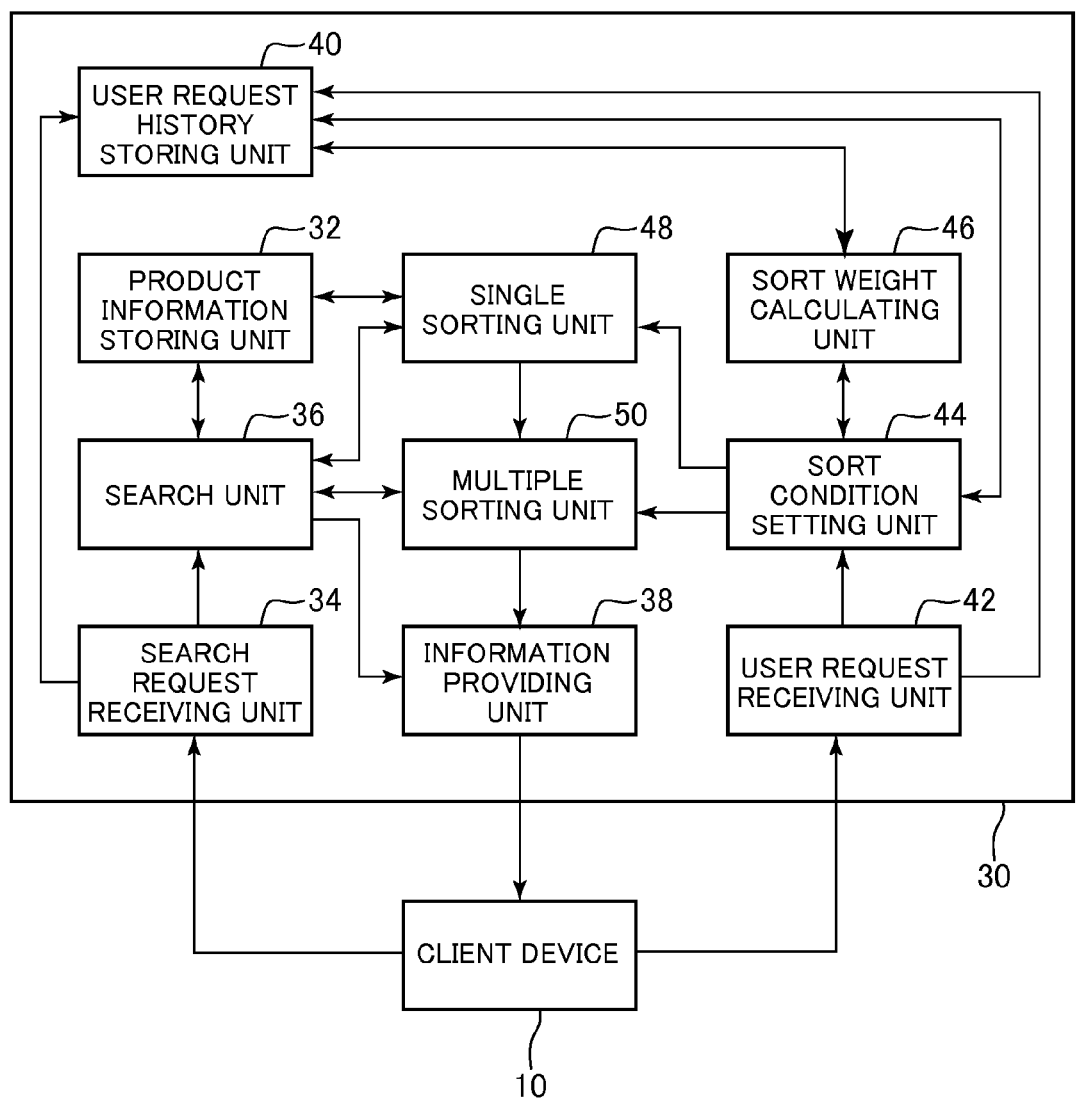
FIG. 2 A diagram illustrating a functional block of an information providing server.

FIG. 2 shows a functional block diagram of the information providing server 30. As shown in FIG. 2, the information providing server 30 includes a product information storing unit 32, a search request receiving unit 34, a search unit 36, an information providing unit 38, a user request history storing unit 40, a user request receiving unit 42, a sort condition setting unit 44, a sort weight calculating unit 46, a single sorting unit 48, and a multiple sorting unit 50.

The functions of the above mentioned units of the information providing server 30 may be implemented in a computer, which includes control means such as a CPU (Central Processing Unit), storage means such as a semiconductor memory and a disk storage drive, and communication means such as a network interface, by the control means executing a program stored in the storage means. The program may be provided to the information providing server 30 while being stored in an information storage medium, or may be provided to the information providing server 30 via data communication means such as the Internet. In the following, the details of the units provided in the information providing server 30 will be explained.

The product information storing unit 32 is a database for storing information on the products sold by each shop. In this embodiment, the product information storing unit 32 is included internally in the information providing server 30. However, the product information storing unit 32 may be provided in an external database server of the information providing server 30. In this case, information providing server 30 may access the external database server including the product information storing unit 32, and refer to storage content of the product information storing unit 32. In the following, an example of data stored in the product information storing unit 32 will be explained.

FIG. 3 shows an example of a product information table stored in the product information storing unit 32. The product information table stores, for example, information on products sold by shops. The product information table may be registered and updated according to information on products that the information providing server 30 receives from shop terminals. In particular, the product information table shown in FIG. 3 contains a plurality of items of attribute information in association with a product ID for identifying the product. The attribute information includes, for example, a product name, keyword for searching the product, shop ID for identifying the shop that sells the product, price of the product, available shipping date (earliest shipping date) of the product, registration date of the product, and reviews of the product.

The search request receiving unit 34 receives a search request for a product from the client device 10. For example, the search request receiving unit 34 may receive, from the client device 10, a search query including a search keyword of the product.

The search unit 36 searches information on the product from the product information storing unit 32 based on the search query that the search request receiving unit 34 has received from the client device 10. For example, the search unit 36 may determine degree of match between a search keyword included in the search query received from the client device 10 and a keyword of each product ID in the product information table stored in the product information storing unit 32, and obtain the product ID having the degree of match that is more than a threshold value as a search result. The searching method may of course be not limited to the above described manner, but another manner may also be applicable.

In response to the request for providing information from the client device 10, the information providing unit 38 obtains information stored in the product information storing unit 32, and provides the client device 10 with the obtained information. For example, when the search request receiving unit 34 receives a search query from the client device 10, the information providing unit 38 provides the client device 10 with information on the product that has been searched by the search unit 36 based on the received search query.

The user request history storing unit 40 stores, for each user who operates a client device 10, histories of processes (e.g., search request, request for sorting search results) requested by the user in association with each other. In the following, an example of data stored in the user request history storing unit 40 will be explained.

FIG. 4 shows an example of a user request history table stored in the user request history storing unit 40. The user request history table stores a search request for a product received from a user and history information on requests for sorting product lists. Specifically, the user request history table shown in FIG. 4 associates and stores a user ID for identifying a user, a search condition (search keyword) relating to a search request, a sort condition relating to a sort request, and processing date and time. The sort condition may specify one or more sort keys and a weight of each sort key. The following specifically describes the user request history table shown in FIG. 4. For user ID "U0001", the user request history table shows a record of receiving a search request specifying a search keyword "camera C001A", and then a request for sorting the obtained search results by a sort key "lowest price." Subsequently, there are recorded receiving a request for sorting the same search results by a sort key "earliest shipping date" and then receiving a request for sorting the same search results by a combination of the sort keys "lowest price" assigned a weight of 0.6 and "earliest shipping date" assigned a weight of 0.4. This embodiment features a multiple sort in which sorting is performed using a combination of a plurality of sort keys. The details of the process of the multiple sort will be explained later.

The user request receiving unit 42 receives, from the client device 10, a request for sorting the product groups (sort target product groups) including sort target products by using the specified condition (sort condition). For example, the sort target product group may include the product searched by the search unit 36 as an element. Further, types of sorts received at the user request receiving unit 42 may include a single sort that uses a single sort key, or a multiple sort that uses a plurality of sort keys. A sort request for the multiple sort includes the following types 1 to 4 of designation methods according to a combination of whether or not the user has designated a sort key and whether or not the user has designated a weight of the sort key.

The type 1 of the designation method of the multiple sort is a method in which the user designates all of the sort keys to use and a weight of each of the sort keys (user all designation method).

The type 2 of the designation method of the multiple sort is a method in which the information providing server 30 automatically selects the sort keys to use, and the user designates a weight of each of the sort keys (weight designation method).

The type 3 of the designation method of the multiple sort is a method in which the user designates the sort keys to use, and the information providing server 30 automatically sets a weight of each of the sort keys (sort key designation method).

The type 4 of the designation method of the multiple sort is a method in which the information providing server 30 automatically sets the sort keys to use and a weight of each of the sort keys (automatic method). Selection of sort keys and setting a weight of the sort key by the information providing server 30 will be explained in detail later.

The sort condition setting unit 44 sets a sort condition based on a sort request received by the user request receiving unit 42. When receiving a request for a single sort (one sort key), the sort condition setting unit 44 sets the sort condition based on the sort key designated in the single sort. When receiving a request for a multiple sort (a plurality of sort keys), the sort condition setting unit 44 sets the sort condition according to the types 1-4 of the designation method of the multiple sort relating to the request. In the following, the process for setting the sort condition according to the types 1-4 of the designation method of the multiple sort will be explained.

When the type 1 of the multiple sort is requested, the sort condition setting unit 44 sets the sort condition based on the sort keys designated by the user and a weight of each of the sort keys.

When the type 2 of the multiple sort is requested, the sort condition setting unit 44 selects a plurality of sort keys to use for the multiple sort based on the processing history stored in the user request history table for the user who has sent the sort request. Specifically, when the user who has sent the sort request requests a single sort for the same sort target product group several times by designating sort keys that are different from each other, the sort condition setting unit 44 may select the designated sort keys as the sort keys of the multiple sort. Further, the sort condition setting unit 44 may select, among the sort keys designated by the user who has sent the sort request, the sort key that has been designated the number of times equal to or more than a threshold value (exceeds a threshold value) as the sort key of the multiple sort. The sort condition setting unit 44 may set a weight of each of the selected sort keys based on the designation of the user.

When the type 3 of the multiple sort is requested, the sort condition setting unit 44 sets plurality of sort keys based on the designation of the user, and sets a weight of each of the sort keys that have been set based on values calculated by the sort weight calculating unit 46. The processing for calculating weights of the sort keys by the sort weight calculating unit 46 will be explained later.

When the type 4 of the multiple sort is requested, the sort condition setting unit 44 selects plurality of sort keys in the same way as in type 2, and sets a weight of each of the sort keys based on the values calculated by the sort weight calculating unit 46 in the same way as in type 3.

The sort weight calculating unit 46 calculates a weight of each of the sort keys when a weight of each of the sort keys set by the sort condition setting unit 44 has not been designated by the user. For example, the sort weight calculating unit 46 may calculate a weight of each of the sort keys (first to Nth sort keys [N is an integer equal to or greater than 2]) based on a value (ratio) that is determined in advance for each of the first to Nth sort keys so that that the total sum of the weights of the first to Nth sort keys is one. For example, when a value that is set for ith (i=1 to N) sort key is Ai, the sort weight calculating unit 46 may calculate the weight wi of the ith sort key as wi=Ai/T (where T=A1+ . . . +AN).

When the user who has sent the sort request requests a single sort several times for the same sort target product group by designating the sort keys that are different from each other, the sort keys may be determined as the first to Nth sort keys respectively, starting with the sort key designated first. At this time, the weights of the first to Nth sort keys may be determined as w1≥w2≥ . . . ≥wn.

The sort weight calculating unit 46 may determine the weight wi (or Ai) of the ith sort key based on the number of times the user who has sent the sort request designates the sort key. At this time, the number of times of designating the sort key may be directed to the same sort target product group or different sort target product groups.

The sort weight calculating unit 46 may calculate, for each of ith sort keys (i=1 to N), degree of variance that indicates variability of data (e.g., distribution and distance from average) of the ith sort key in the sort target product group, and sets a weight of the ith sort key based on the calculated degree of variance. Specifically, the sort weight calculating unit 46 may calculate degree of variance (e.g., distribution) of data of the ith sort key in the sort target product group, and set the weight wi (or Ai) of the ith sort key based on the calculated degree of variance.

The single sorting unit 48 sorts a sort target product group based on the designated single sort key. For example, the single sorting unit 48 may calculate, for each product ID included in the sort target product group, a sort score (evaluation value) of the designated sort key (e.g., in order of lowest price), and rearrange the order of the product IDs based on the calculated sort scores. Here, the single sorting unit 48 may obtain a sort score of the product ID based on rank, deviation value, difference from the average etc. of a data value (e.g., price) in the sort target product group, where the data value is stored in the product information table in association with the product ID for the designated sort key. The single sorting unit 48 may normalize the sort score when the sort score is not normalized in the plurality of sort keys. This embodiment explains an example where the sort score of the product ID is the rank in the sort target product group.

The multiple sorting unit 50 sorts the sort target product group based on the sort keys (first to Nth sort keys) set by the sort condition setting unit 44 and respective weights of the sort keys (first to Nth sort keys). For example, the multiple sorting unit 50 obtains a sort score Vji calculated by the single sorting unit 48 regarding the ith (i=1 to N) sort key for each of the products (Sj, j=1 to M) included in the sort target product group. Subsequently, the multiple sorting unit 50 calculates a multiple sort score TVj of the product Sj as the weight wi of the ith sort key by the following equation (1):

$$TVj = \sum_{i=1}^{N} wi \cdot Vji \quad (1)$$

The multiple sorting unit 50 calculates a multiple sort score of each of the products included in the sort target product group, and rearranges the products included in the sort target product group according to the rank based on the calculated multiple sort scores.

When a single sort is requested, the information providing unit 38 provides the client device 10 with a product list in which the sort target product groups (e.g., product groups searched by the search unit 36) are rearranged based on the sort result by the single sorting unit 48. When a multiple sort is requested, the information providing unit 38 provides the client device 10 with a product list in which the sort target product groups are rearranged based on the sort result by the multiple sorting unit 50. The information providing unit 38 may include, in the product list, the products up to the predetermined rank from the top in the sort target product group.

3. Flow Chart

Next, information providing processing performed by the information providing server 30 for the client device 10 will be explained with the specific examples. In this regard, FIGS. 5, 6, and 14 illustrate flow charts, FIGS. 7-9 illustrate examples of sort scores, and FIGS. 10-13 and 15-21 illustrates examples of screen transition.

3.1. Flow Chart of Processing According to First Embodiment

Figure 5:
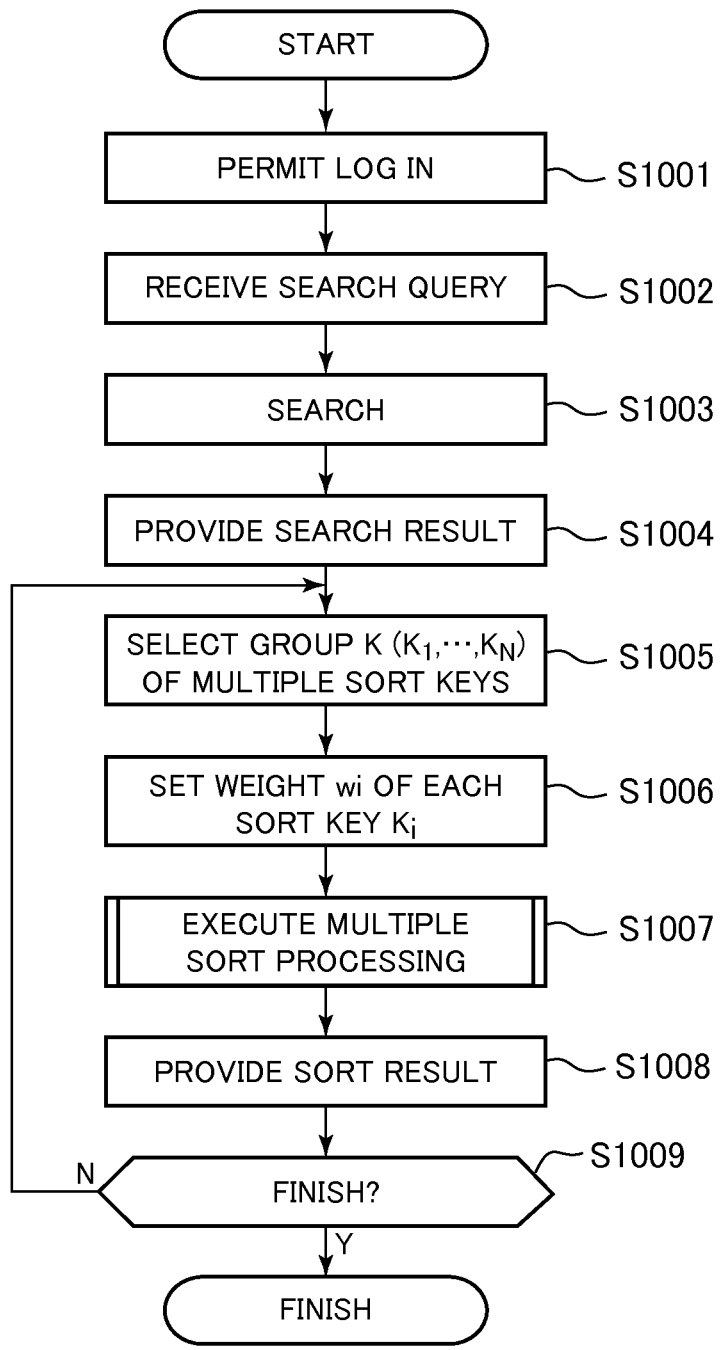
FIG. 5 A diagram illustrating an example of a flow chart indicating overall flow of information providing processing according to a first embodiment.
Figure 6:
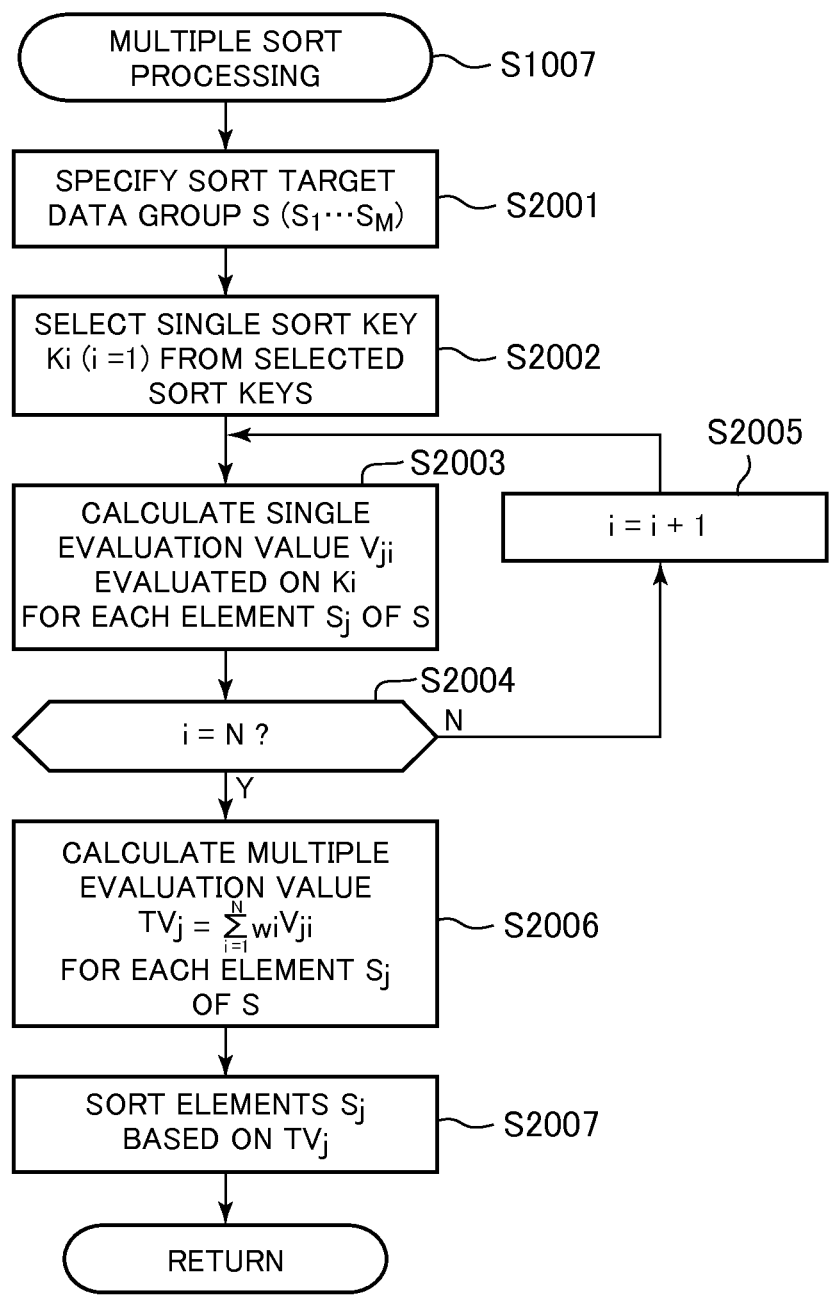
FIG. 6 A diagram illustrating an example of a flow chart of multiple sort processing.

FIG. 5 shows an example of a flow chart indicating overall flow of the information providing processing according to the first embodiment.

As shown in FIG. 5, the information providing server 30 receives a user ID and authentication information including a password from the client device 10 to permit a user to login (S1001).

Figure 10:
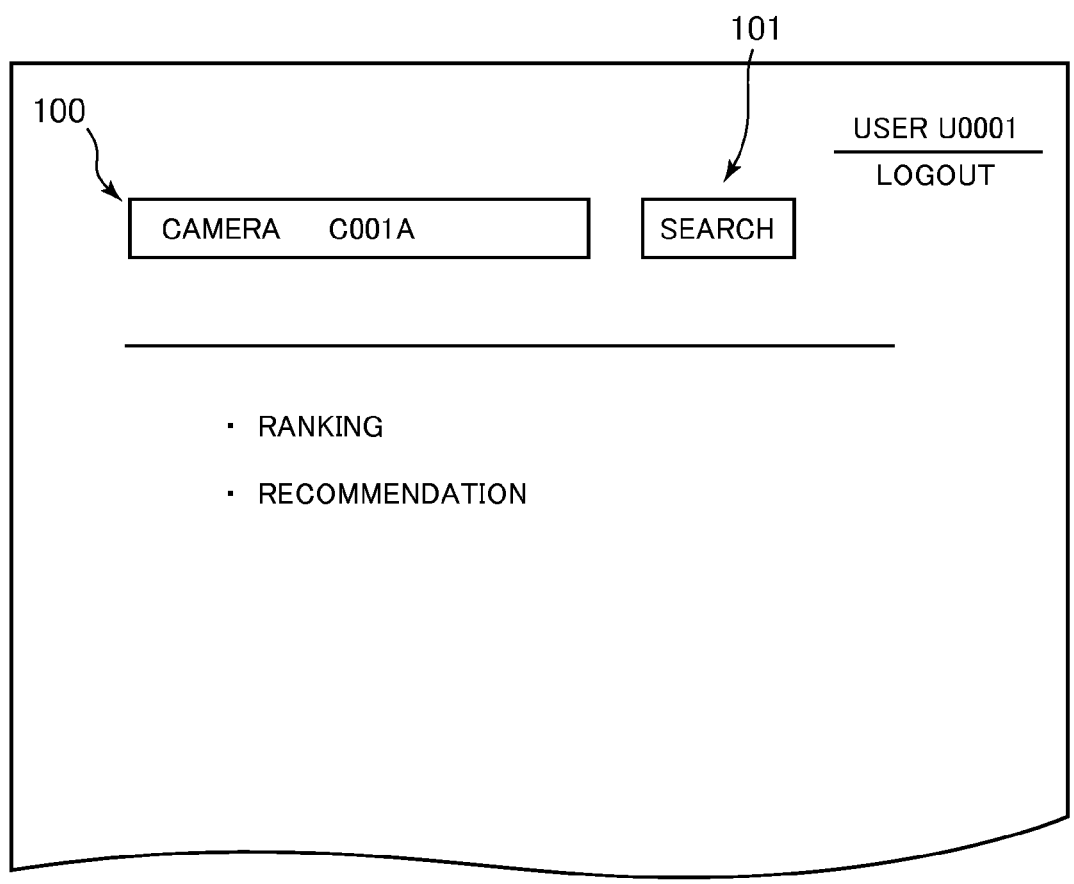
FIG. 10 A diagram illustrating an example of a product search screen.

The client device 10 displays a product search screen as shown in FIG. 10, for example, based on the display data received from the information providing server 30. After a search keyword of the product is entered in an entry field 100 for search keywords on the product search screen and a "Search" button 101 is pressed, the client device 10 sends a search query including the search keyword to the information providing server 30.

Upon receiving the search query including the search keyword of the product from the client device 10 (S1002), the information providing server 30 searches information on the corresponding product in the product information table based on the received search query (S1003). Subsequently, the information providing server 30 provides the client device 10 with a list of information on the searched products (see e.g., FIG. 11) (S1004).

Figure 11:
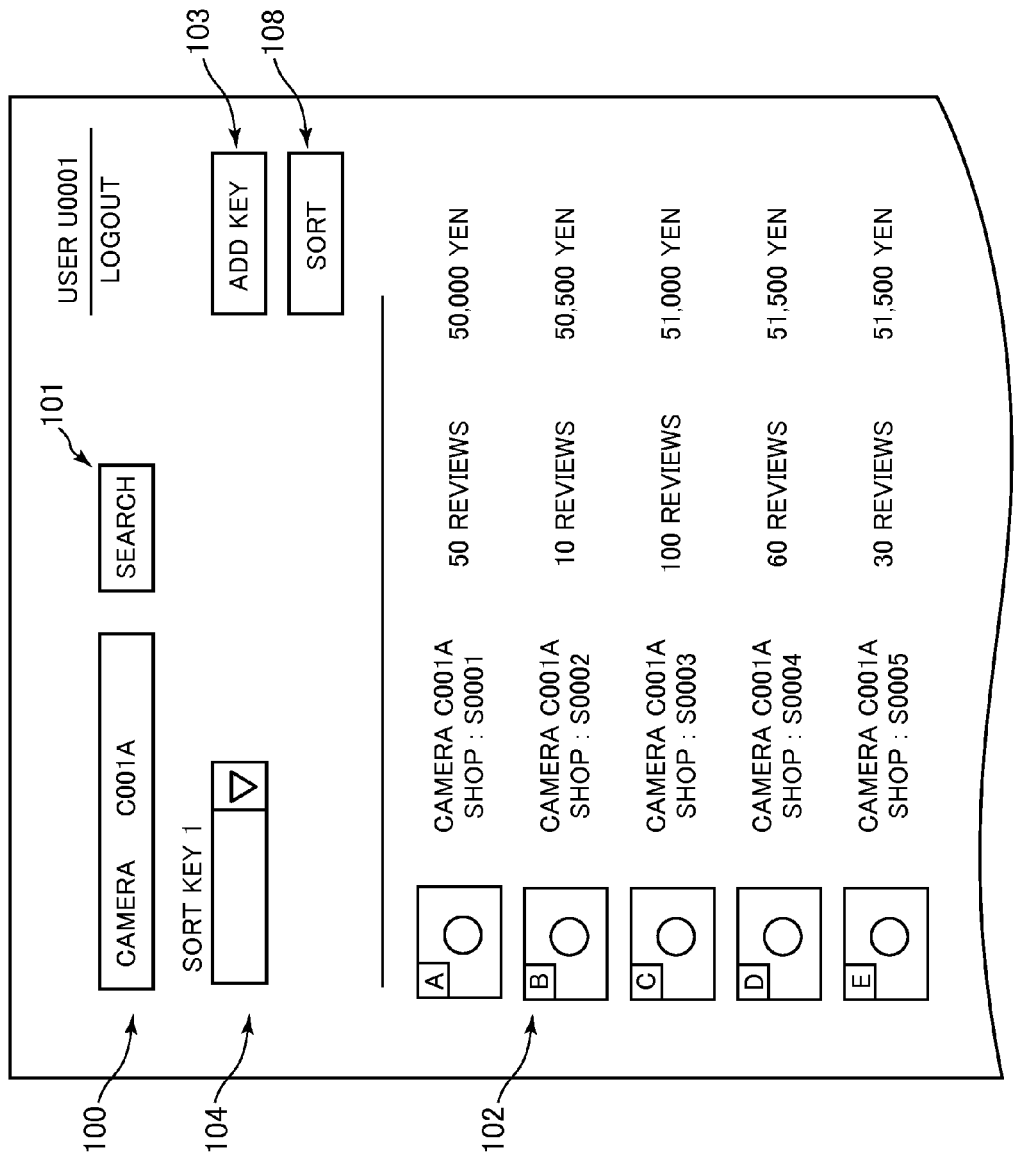
FIG. 11 A diagram illustrating an example of a product list display screen.

Based on the information provided by the information providing server 30, the client device 10 displays a product list display screen including the list of products searched based on the search query as shown in, for example, FIG. 11. As shown in FIG. 11, the product list display screen includes a display section 102 for displaying a list of products searched in response to a request from a user, and a selection box 104 for the sort key 1. For example, when an "Add Key" button 103 shown in FIG. 11 is pressed on the product list display screen of the client device 10, the client device 10 sends a supplemental query of the sort key to the information providing server 30. The information providing server 30 then sends to the client device 10 display data for displaying the product list display screen to which a sort key is added.

Figure 12:
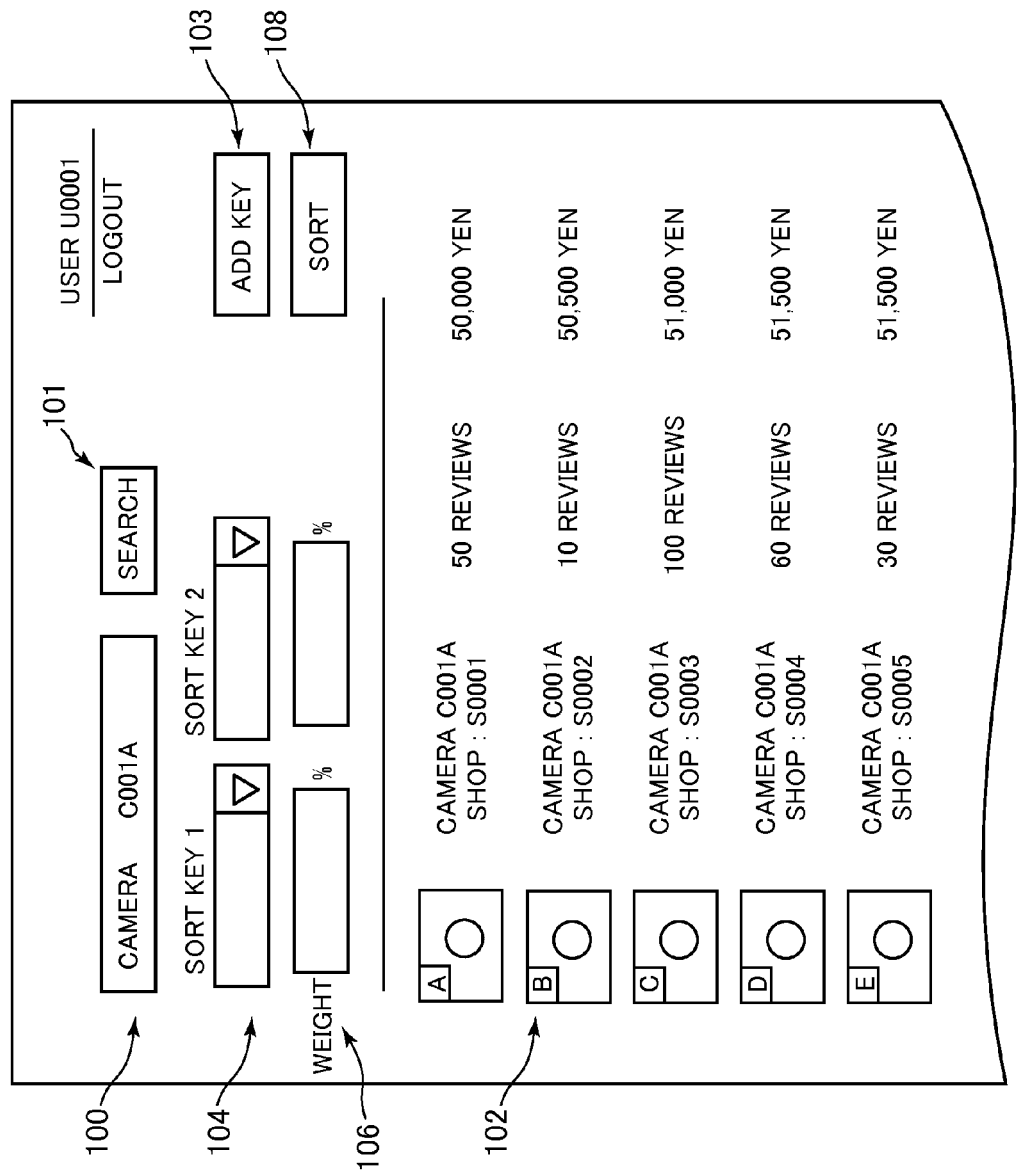
FIG. 12 A diagram illustrating an example of the product list display screen.

FIG. 12 shows an example of the product list display screen to which a sort key is added. In the product list display screen shown in FIG. 12, a selection box of a sort key 2, an entry field 106 for a weight of the sort key 1, and an entry field of a weight of the sort key 2 are added. Here, in FIG. 12, when values are respectively set in the selection box 104 of the sort key 1, the selection box of the sort key 2, the entry field 106 of the weight of the sort key 2, and the entry field of the weight of the sort key 1, and the "Sort" button 108 is pressed, the client device 10 sends to the information providing server 30 a multiple sort request including details and weights of the plurality of sort keys.

Upon receiving the multiple sort request from the client device 10, the information providing server 30 selects a group K (element of K is Ki, i=1 to N) of a plurality of sort keys to be used for the multiple sort based on the received multiple sort request (S1005). When sort keys are designated in the multiple sort request, the designated sort keys may be selected as sort keys to be used for the multiple sort. When the sort keys are not designated in the multiple sort request (e.g., when "Sort" button 108 is pressed without selecting a sort key), the information providing server 30 may select, from among the sort keys stored in the user request history table in association with the user ID of the user who has sent the sort request, sort keys in a descending order of the number of times that the sort key has been designated.

The information providing server 30 sets a weight wi of each of elements Ki of the group K of the sort keys selected in S1005 (S1006). When the weight wi of the sort key Ki is designated in the multiple sort request received from the client device 10, the weight wi may be set as designated in the request. When the weight wi of the sort key Ki is not designated in the multiple sort request received from the client device 10, the sort weight calculating unit 46 may set the weight wi based on values that are predetermined for respective sort keys 1 to N, or based on the designated order or the number of times that the sort key Ki has been designated.

The information providing server 30 executes the multiple sort processing based on each element Ki and the weight wi of Ki of the group K of the selected sort keys (S1007). The multiple sort processing will be explained in detail by referring to the flow chart shown in FIG. 6.

As shown in FIG. 6, the information providing server 30 specifies a group S (element Sj, where j=1 to M [M is an integer equal to or greater than 2]), which is a data group to be sorted (sort target product group) (S2001). In this flow chart, the sort target product group is a product group searched using a search query. However, the sort target product group may be a product group that belongs to a category designated by the user.

The information providing server 30 selects a sort key (single sort key Ki, initial value of i=1) from the group K of the plurality of sort keys to be used for the multiple sort processing (S2002). The information providing server 30 then calculates, for each element Sj included in the group S of the sort target product groups, a single evaluation value (sort score) Vji evaluated on the selected Ki (S2003).

FIG. 7 shows an example of a result of the single sort processing in a case where the sort target product groups are M0001 to M0005 and the sort key is "price (in order of lowest price)." In the example shown in FIG. 7, the sort scores (evaluation values) are ranks listed in descending order of the prices. However, the sort scores may be listed in order of differences from basic values (e.g., average value, minimum value, maximum value) or deviation values.

FIG. 8 shows an example of a result of the single sort processing in a case where the sort target product groups are M0001 to M0005 and the sort key is "shipping date (in order of earliest shipping date)." In the example shown in FIG. 8, the sort scores (evaluation values) are ranks listed in descending order of the shipping dates. However, the sort scores may be listed in order of differences from basic values (e.g., average value, minimum value, maximum value) or deviation values.

If there is another Ki that is not processed, i.e., if "i" is not equal to "N" (S2004:N), the information providing server 30 increments "i" (S2005) and returns to S2003. On the other hand, if there is no Ki that is not processed, i.e., if "i" is equal to "N" (S2004:Y), the information providing server 30 calculates, for each element Sj included in the group S of the sort target product groups, a multiple evaluation value TVj (multiple sort score) based on the equation (1) using the sort score Vji for the sort key Ki and the weight wi for the sort key Ki (S2006).

FIG. 9 shows an example of a multiple evaluation value that is calculated when the sort target product groups are M0001 to M0005, the sort key 1 is "price (in order of lowest price)", the sort key 2 is "shipping date (in order of earliest shipping date)", the weight of the sort key 1 is 0.6, and the weight of the sort key 2 is 0.4.

The information providing server 30 sorts elements Sj included in the group S of the sort target product groups based on the multiple evaluation value TVj calculated in S2006 (S2007), and returns.

In the example shown in FIG. 9, the products may be sorted in ascending order of the multiple evaluation values. When the differences from the reference values (e.g., average value, minimum value, and maximum value) and the deviation value are used as sort scores (evaluation values), the products may be sorted in descending order of the multiple evaluation values.

Turning again to the flow chart of FIG. 5, the information providing server 30 provides the client device 10 with the list of the products in the sort target product groups rearranged based on the result of the multiple sort (see e.g., FIG. 13) (S1008).

Figure 13:
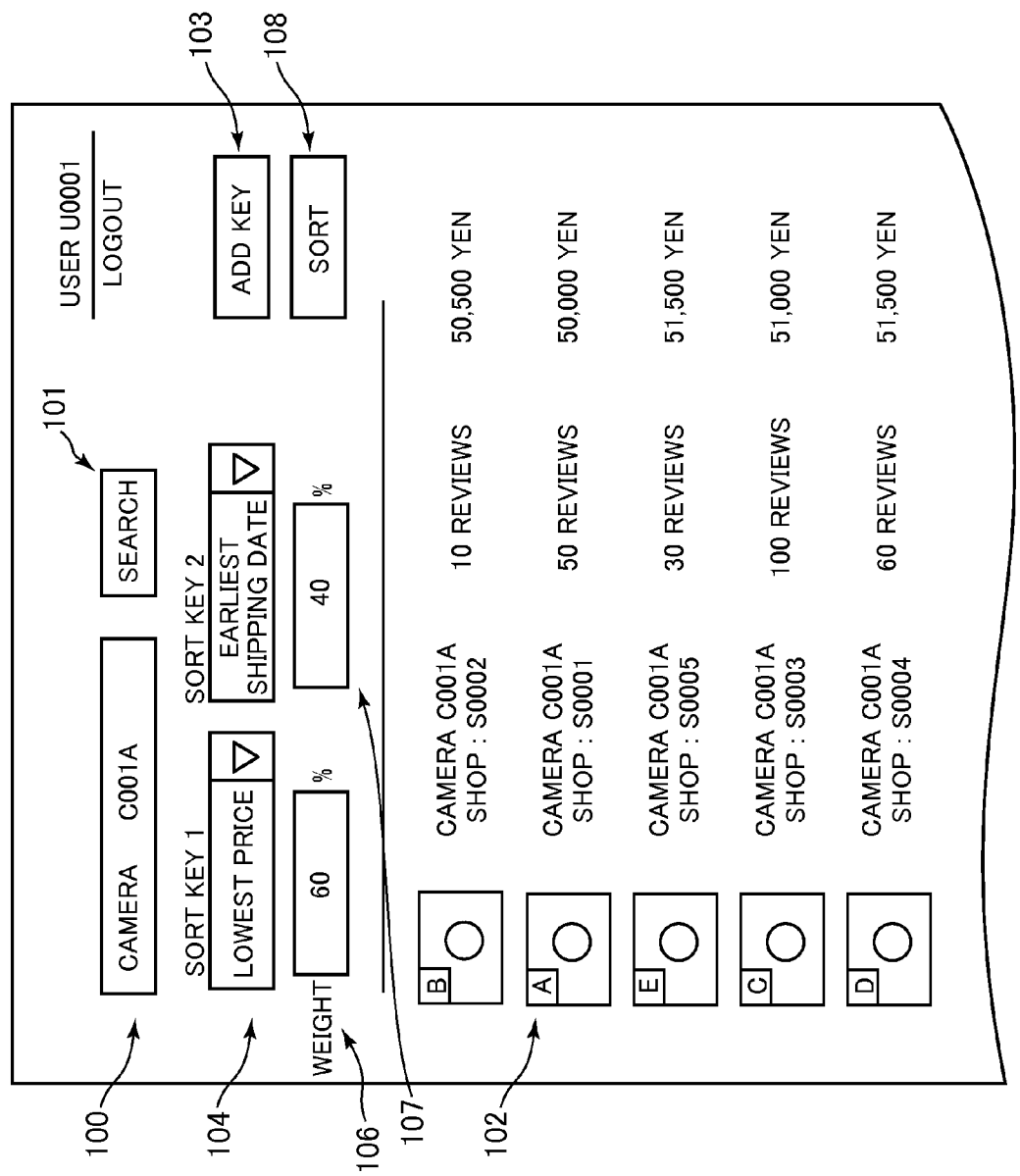
FIG. 13 A diagram illustrating an example of the product list display screen.
Figure 14:
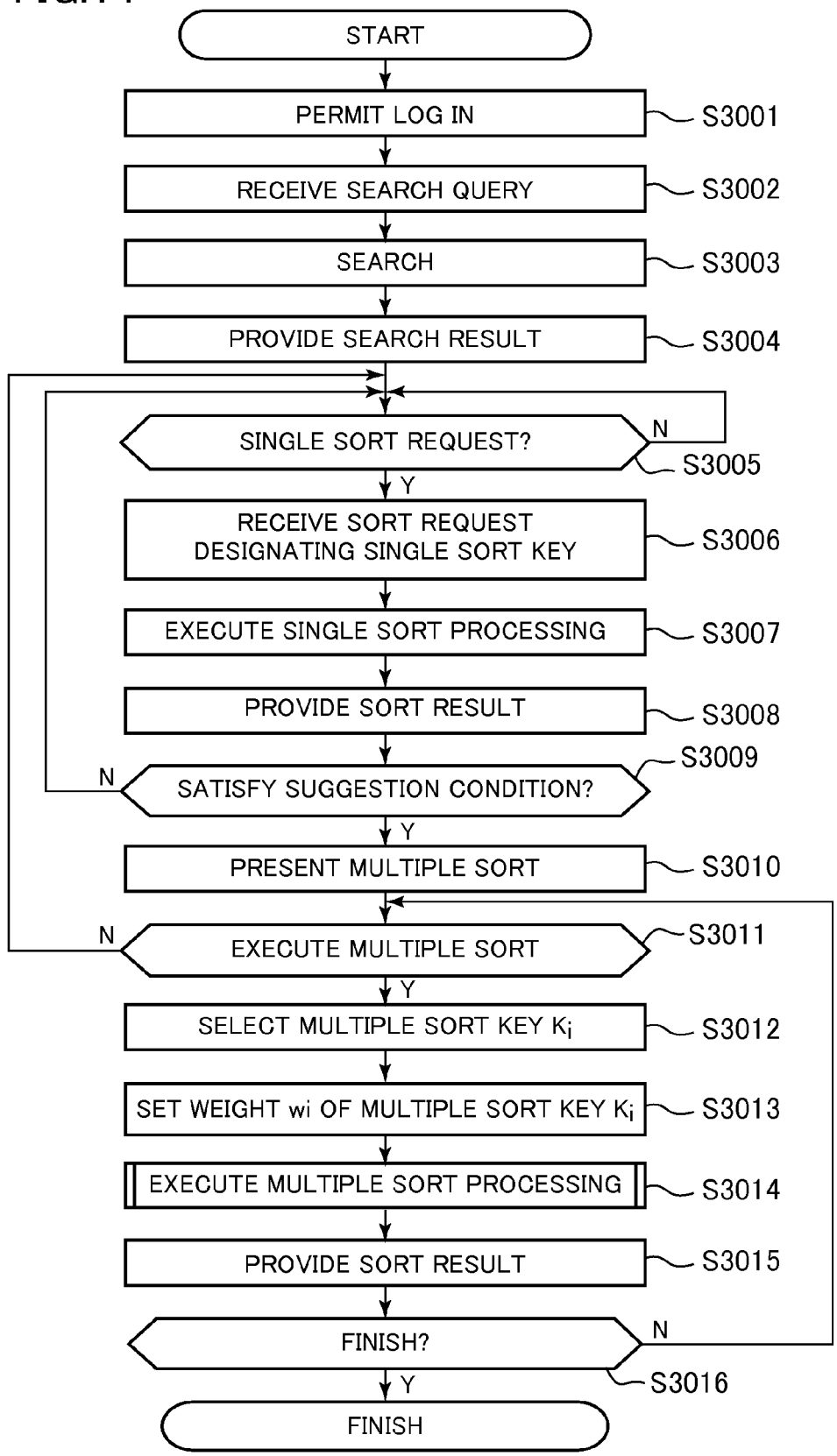
FIG. 14 A diagram illustrating an example of a flow chart indicating overall flow of information providing processing according to a second embodiment.

FIG. 13 shows an example of a product list display screen after the multiple sort was performed. In the product list display screen shown in FIG. 13, the list display section 102 displays a product list in which the products are rearranged by setting the sort key 1 as "price (in order of lowest price)", the sort key 2 as "shipping date (in order of earliest shipping date)", the weight of the sort key 1 as 0.6(60%), and the weight of the sort key 2 as 0.4(40%).

If the multiple sort processing is not to be finished (S1009: N), the information providing server 30 returns to S1005, and if the multiple sort processing is to be finished (S1009:Y), the information providing server 30 finishes the processing.

3.2. Flow Chart of Processing According to Second Embodiment

In the following, the second embodiment of the information providing processing performed by the information providing server 30 to the client device 10 will be described.

FIG. 14 shows an example of a flow chart indicating overall flow of the information providing processing according to the second embodiment.

As shown in FIG. 14, the information providing server 30 receives a user ID and authentication information including a password from the client device 10 to permit a user to log in (S3001).

Upon receiving the search query including the search keyword of the product from the client device 10 (S3002), the information providing server 30 searches information on the corresponding product in the product information table based on the received search query (S3003). Subsequently, the information providing server 30 provides the client device 10 with a list of information on the searched product (see e.g., FIG. 11) (S3004).

Based on the information provided by the information providing server 30, the client device 10 displays a product list display screen including a list of products searched based on the search query as shown in, for example, FIG. 11. For example, in the client device 10 shown in FIG. 11, when "lowest price" is entered in the sort key 1 on the product list display screen and then "Sort" button 108 is pressed, the client device 10 sends to the information providing server 30 a sort request designating a single sort key.

If the client device 10 does not send a single sort request (S3005:N), the information providing server 30 waits, and if the client device 10 sends a single sort request (S3005:Y), the information providing server 30 receives a sort request designating a single sort key from the client device 10 (S3006).

The information providing server 30 executes the sort processing (single sort processing) based on the single sort key designated by the client device 10 (S3007), and provides the client device 10 with a list (see e.g., FIG. 15) in which the products in the sort target product groups are rearranged based on the result of the multiple sort (S3008). For example, in the product list display screen shown in FIG. 15, the list display section 102 displays a product list in which the products are rearranged by the single sort using the sort key "price (in order of lowest price)".

The information providing server 30 determines whether or not the single sort processing satisfies suggestion conditions of the multiple sort processing based on the history of the executed single sort processing (S3009). For example, the suggestion conditions of the multiple sort processing may include whether or not the single sorts are executed using different sort keys for the same sort target product group, and whether or not the single sorts are executed a predetermined number of times or more for the same or different sort target product groups using different sort keys.

Figure 16:
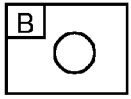
FIG. 16 A diagram illustrating an example of the product list display screen.

If the suggestion condition of the multiple sort processing is not satisfied (S3009:N), the information providing server 30 returns to S3005. Subsequently, as shown in FIG. 16, when a single sort is requested by designating "earliest shipping date" in the sort key 1 on the product list display screen, the suggestion condition of the multiple sort processing is satisfied at S3009. In this case (S3009:Y), the information providing server 30 leads the client device 10 to the multiple sort (S3010).

Figure 17:
FIG. 17 A diagram illustrating an example of the product list display screen.

FIGS. 17-18 show examples of screens to explain an example of the processing for presenting the multiple sort performed by the information providing server 30 at S3010.

FIG. 17 shows an example of a screen for presenting the user with a plurality of sort keys to be used in the multiple sort. In this case, the information providing server 30 presents the user with the screen in which the single sort keys designated for the same sort target product group are respectively set as default values in the sort key 1 and the sort key 2.

FIG. 18 shows an example of a screen for presenting the user with a plurality of sort keys and their weights to be used in the multiple sort. In this case, the information providing server 30 presents the user with the screen in which the single sort keys designated for the same sort target product group are respectively set as default values in the sort key 1 and the sort key 2, and the weight of the single sort key (sort key 1) executed previously is set greater than the weight of the single sort key (sort key 2) executed later.

In the client device 10, when values are set (re-established) in the selection box 104 of the sort key 1, the selection box 105 of the sort key 2, the entry field 106 of the weight of the sort key 1, and the entry field 107 of the weight of the sort key 2 in FIG. 17 or FIG. 18, and then "Sort" button 108 is pressed, the client device 10 sends to the information providing server 30 a multiple sort request including details and weights of the sort keys. Here, when the multiple sort is not executed (S3011:N), the processing may return to S3005.

When receiving the multiple sort request from the client device 10, that is, executing the multiple sort (S3011:Y), the information providing server 30 selects a group K (element of K is Ki, i=1 to N) of the sort keys to be used for the multiple sort based on the received multiple sort request (S3012). If sort keys are designated in the multiple sort request, the designated sort keys may be selected as sort keys to be used for the multiple sort. If sort keys are not designated in the multiple sort request (e.g., when sort keys are not selected and "Sort" button 108 is pressed), the information providing server 30 may select, from among the sort keys stored in the user request history table in association with the user ID of the user who has sent the sort request, sort keys in a descending order of the number of times that the sort key has been designated.

The information providing server 30 sets a weight wi of each element Ki of the group K of the sort keys selected in S3012 (S3013). When the weight wi of the sort key Ki is designated in the multiple sort request received from the client device 10, the weight wi may be set as designated in the request. When the weight wi of the sort key Ki is not designated in the multiple sort request received from the client device 10, the sort weight calculating unit 46 may set the weight wi based on values that are predetermined for respective sort keys 1 to N, or based on the designated order or the number of times that the sort key Ki has been designated.

The information providing server 30 executes the multiple sort processing based on each element Ki and the weight wi of Ki of the group K of the selected sort keys (S3014). The details of the multiple sort processing are the same as the flow chart shown in FIG. 6, and thus descriptions thereof are omitted.

The information providing server 30 provides the client device 10 with a list (see e.g., FIG. 13) in which the products in the sort target product group are rearranged based on the result of the multiple sort processing (S3015).

If the multiple sort processing is not to be finished (S3016:N), the information providing server 30 returns to S3011, and if the multiple sort processing is to be finished (S3016:Y), the information providing server 30 finishes the processing.

Figure 19:
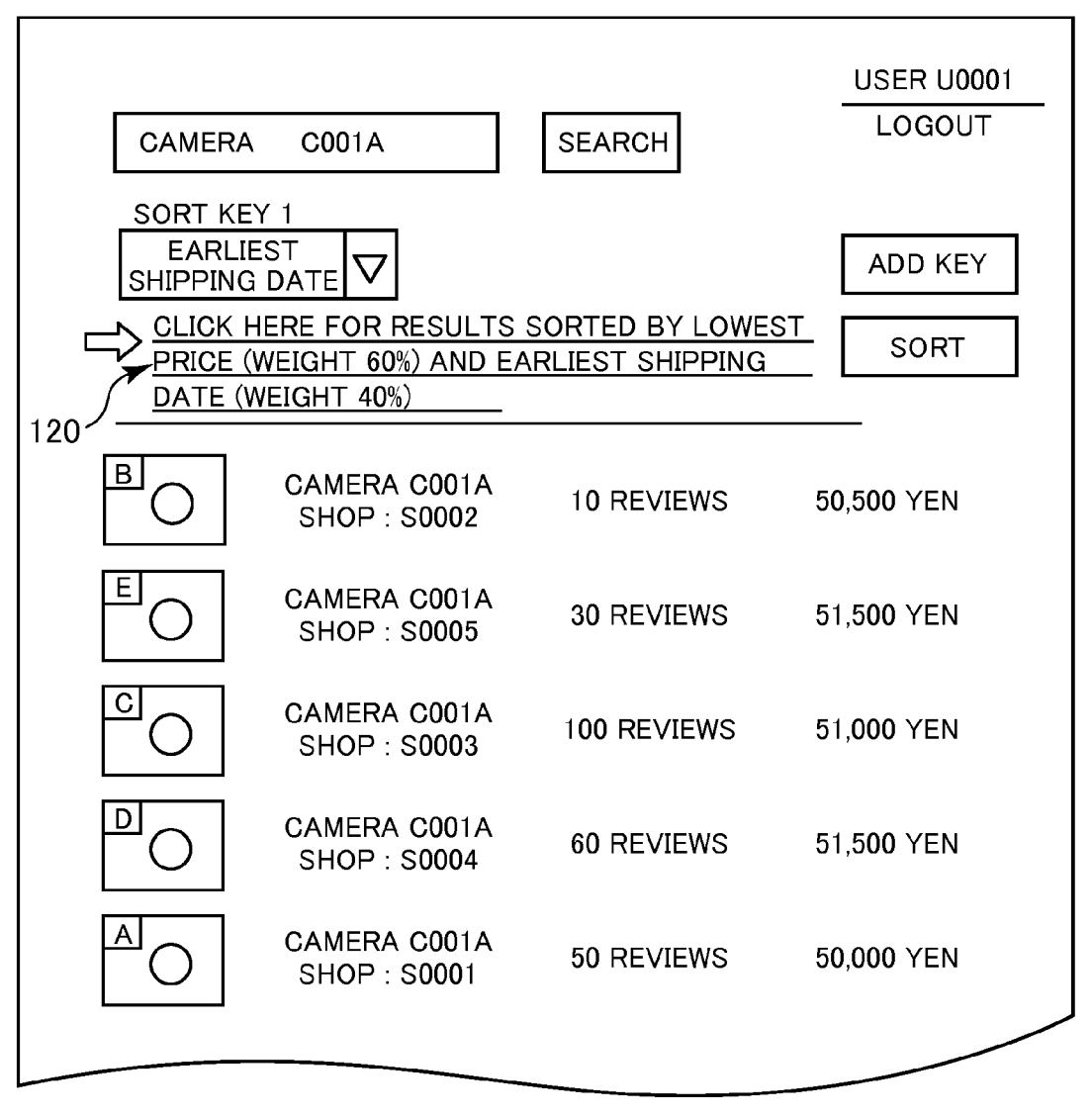

In the flow chart described above, the multiple sort is executed after the multiple sort is presented to the user at S3010. However, as shown in FIG. 19, a page displaying the result of the multiple sort may be presented to the user by including, in the screen, a link 120 to the page displaying the result of the multiple sort that is executed based on the sort keys and their weights set by the information providing server 30.

4. Modification Example

The present invention is not to be limited to the above described embodiment. For example, when the total sum of the weights w1 to wN of the first to Nth sort keys, which are used in the multiple sort, is a constant value (e.g., 1) and the weight wi of the sort key i (i=any of 1 to N) is updated, the weights other than the weight wi may also be updated so that that the total sum of the weights w1 to wN is to be the constant value.

Figure 20:
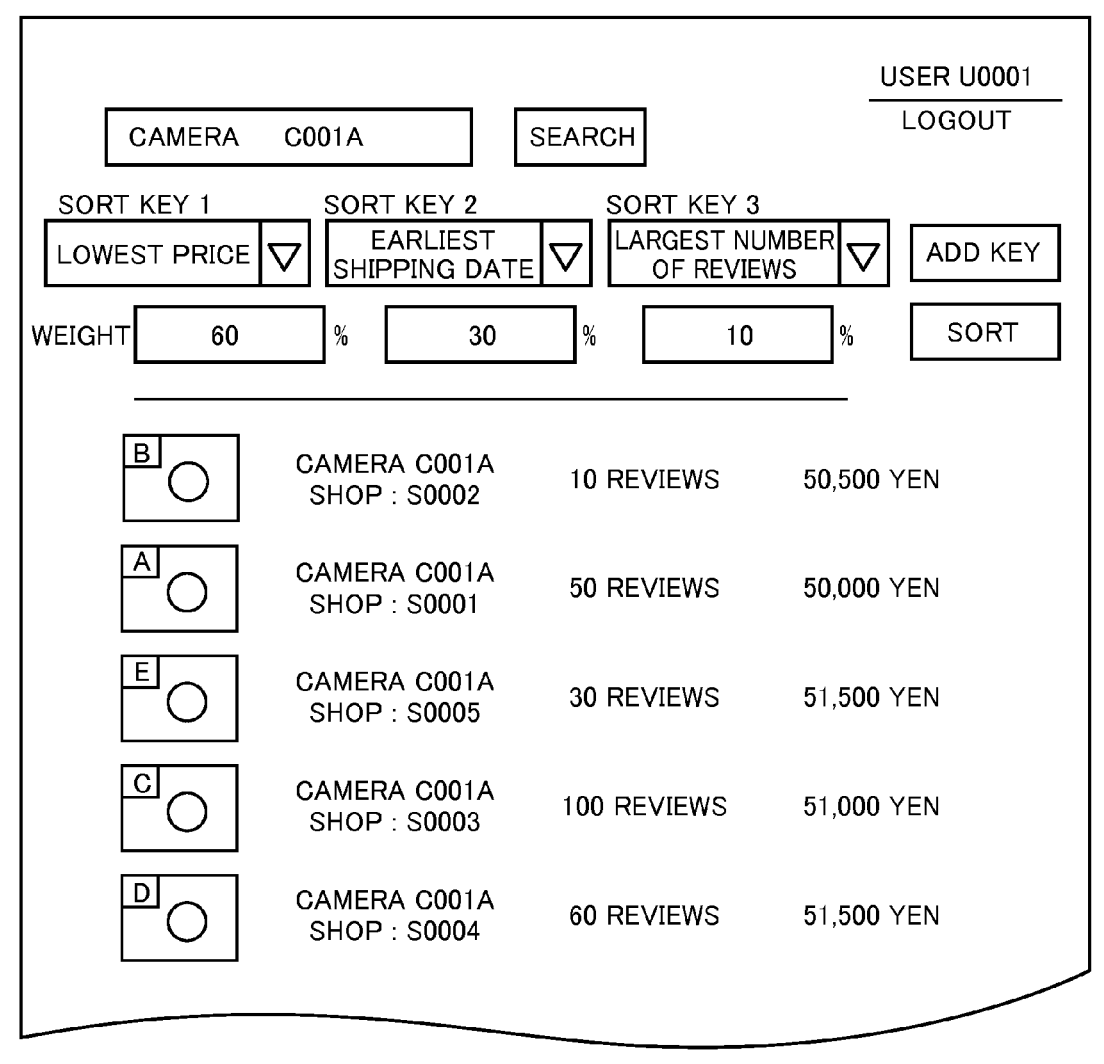
Figure 21:
FIG. 21 A diagram illustrating an example of the product list display screen.

Further, as shown in FIG. 20, in a case where the sort keys 1 to N (N is 3 or more) to be used for the multiple sort are selected and the weights w1 to wN (w1+w2+ . . . +wN=1) are determined for the respective sort keys, and when the one of the values (e.g., w1) is updated, the values of w2 to wN may also be updated so that the total sum of the updated weights w1 to wN remains 1 while the ratio among w2 to wN remains unchanged. For example, when the weight 60% of the sort key 1 in FIG. 20 is updated to 40% as shown in FIG. 21, the weights of the sort key 2 and the sort key 3 in FIG. 21 may be respectively updated to 45% and 15% so that the total sum of the updated weights of the sort keys 1 to 3 is 100% while the ratio between the weights of the sort key 2 and the sort key 3 remains 3:1.

The embodiment described above explains the example where the information providing server 30 executes the multiple sort of the sort target product group and provides the client device 10 with the sort result. However, the multiple sort may be executed at the client device 10. In this case, the client device 10 may obtain results of single sorts for respective sort keys to be used in the multiple sort from the information providing server 30 (see e.g., sort results of FIG. 7 and FIG. 8), and add up the obtained single sort results based on the weights designated for respective single sort keys in order to obtain the result of the multiple sort (see e.g., FIG. 9).

The present invention explains the examples of rearranging the search results. In this regard, a target to be rearranged is not to be limited to a search result, but products (services) that are included in one or more categories designated by a user or products (services) that are sold at one or more shops designated by a user may also be targets to be rearranged.

The invention claimed is:
1. An information providing device comprising:
at least one processor; and
at least one memory device that stores a plurality of instructions, which when executed by the at least one processor, causes the at least one processor to operate to:

specify a plurality of items of data, each item of data comprising a plurality of items of attribute information;
obtain a plurality of sort keys for sorting the plurality of items of data;
calculate:
(i) for each of the plurality of sort keys, evaluation values of the plurality of items of data, the evaluation values being used for sorting the plurality of items of data based on one of the plurality of sort keys, and
(ii) multiple evaluation values of the plurality of items of data, each of the multiple evaluation values being calculated based on the evaluation values for the plurality of sort keys and the respective weights of the plurality of sort keys;
sort the plurality of items of data based on the multiple evaluation values that are calculated; and
provide at least part of a sort result by the sorting unit,
wherein when executed by the at least one processor, the plurality of instructions cause the at least one processor to operate to:
manage, for each user, history information of the sort keys used for sorting the plurality of items of data; and
set at least either of the plurality of sort keys and the weights of the respective sort keys based on history information managed for a user who requests to sort the specified plurality of items of data, and
wherein when a plurality of sorts are executed a predetermined number of times for the plurality of items of data and different sort keys are designated during the plurality of sorts, the plurality of instructions cause the at least one processor to operate to set the plurality of sort keys based on at least two of the designated sort keys.

2. The information providing device according to claim 1, wherein
in a case where a plurality of sorts are executed for the plurality of items of data, the sorts respectively designating sort keys different from one another, the plurality of instructions cause the at least one processor to operate to set a weight of each of the plurality of sort keys based on at least either of an order in which the sorting is executed and a number of times the sorts are executed.

3. The information providing device according to claim 2, wherein when executed by the at least one processor, the plurality of instructions cause the at least one processor to operate to:
present the user with information on a page on which the sort result is displayed when the sorts respectively designating sort keys different from one another are executed a predetermined number of times in the plurality of items of data, the sort result being based on the set plurality of sort keys and the respective weights of the plurality of sort keys.

4. The information providing device according to claim 1, wherein when executed by the at least one processor, the plurality of instructions cause the at least one processor to operate to:
present the user with information on a page on which the sort result is displayed when the sorts respectively designating sort keys different from one another are executed a predetermined number of times in the plurality of items of data, the sort result being based on the set plurality of sort keys and the respective weights of the plurality of sort keys.

5. The information providing device according to claim 1, wherein,
when a total sum of the weights of the plurality of sort keys is a constant value and one of the weights of the plurality of sort keys is updated, the plurality of instructions cause the at least one processor to operate to update the weights of other sort keys such that the total sum of the weights of the plurality of sort keys is the constant value.

6. The information providing device according to claim 5, wherein,
in a case where the plurality of sort keys are three or more and one of the weights of the plurality of sort keys is updated, the plurality of instructions cause the at least one processor to operate to update the weights of other sort keys such that the total sum of the weights of the plurality of sort keys is the constant value and a ratio among the weights of other sort keys remains unchanged.

7. The information providing device according to claim 1, wherein when executed by the at least one processor, the plurality of instructions cause the at least one processor to operate to calculate, for one of the plurality of sort keys, evaluation values of the respective plurality of items of data based on one of the plurality of items of attribute information of the respective plurality of items of data, the one of the plurality of items of attribute information being related to the one of the plurality of sort keys.

8. The information providing device according to claim 1, wherein when executed by the at least one processor, the plurality of instructions cause the at least one processor to operate to calculate, in the plurality of items of data, variability of the items of attribute information, each of which is designated for each of the plurality of sort keys, and setting the weights of the respective sort keys such that the sort key having a greater variability has a greater weight.

9. An information providing method comprising:
specifying a plurality of items of data, each item of data including a plurality of items of attribute information;
obtaining a plurality of sort keys for sorting the plurality of items of data;
calculating, in the plurality of items of data, variability of the items of attribute information, each of which is designated for each of the plurality of sort keys, and setting the weights of the respective sort keys such that the sort key having a greater variability has a greater weight;
calculating, for each of the plurality of sort keys, evaluation values of the plurality of items of data, the evaluation values being used for sorting the plurality of items of data based on one of the plurality of sort keys;
calculating multiple evaluation values of the plurality of items of data, each of the multiple evaluation values being calculated based on the evaluation values for the plurality of sort keys and the respective weights of the plurality of sort keys;
sorting the plurality of items of data based on the multiple evaluation values that are calculated; and
providing at least part of a sort result, and
further comprising:
managing, for each user, history information of the sort keys used for sorting the plurality of items of data; and
setting at least either of the plurality of sort keys and the weights of the respective sort keys based on history information managed for a user who requests to sort the specified plurality of items of data, and
wherein when a plurality of sorts are executed a predetermined number of times for the plurality of items of data and different sort keys are designated during the plurality of sorts, setting the plurality of sort keys based on at least two of the designated sort keys.

10. An information non-transitory storage medium that stores a program for causing a computer to function as:

specifying means for specifying a plurality of items of data, each item of data including a plurality of items of attribute information;

obtaining means for obtaining a plurality of sort keys for sorting the plurality of items of data;

a weight setting means for calculating, in the plurality of items of data, variability of the items of attribute information, each of which is designated for each of the plurality of sort keys, and setting the weights of the respective sort keys such that the sort key having a greater variability has a greater weight;

calculating means for calculating:

(i) for each of the plurality of sort keys, evaluation values of the plurality of items of data, the evaluation values being used for sorting the plurality of items of data based on one of the plurality of sort keys, and (ii) multiple evaluation values of the plurality of items of data, each of the multiple evaluation values being calculated based on the evaluation values for the plurality of sort keys and the respective weights of the plurality of sort keys;

sorting means for sorting the plurality of items of data based on the multiple evaluation values that are calculated; and providing means for providing at least part of a sort result by the sorting means, and further comprising:

managing means for managing, for each user, history information of the sort keys used for sorting the plurality of items of data, and setting means for setting at least either of the plurality of sort keys and the weights of the respective sort keys based on history information managed for a user who requests to sort the specified plurality of items of data, and wherein when a plurality of sorts are executed a predetermined number of times for the plurality of items of data and different sort keys are designated during the plurality of sorts, the setting means sets the plurality of sort keys based on at least two of the designated sort keys.

* * * * *